US008310789B2

(12) United States Patent
Contreras et al.

(10) Patent No.: US 8,310,789 B2
(45) Date of Patent: Nov. 13, 2012

(54) CONDUCTOR SUSPENSION STRUCTURE AND ELECTRICAL CONNECTION ASSEMBLY FOR TRANSMITTING COMPLEMENTARY SIGNALS IN A HARD DISK DRIVE

(75) Inventors: John T. Contreras, San Jose, CA (US);
Nobumasa Nishiyama, Yokohama (JP);
Xinzhi Xing, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 329 days.

(21) Appl. No.: 12/645,217

(22) Filed: Dec. 22, 2009

(65) Prior Publication Data
US 2011/0149442 A1 Jun. 23, 2011

(51) Int. Cl.
*G11B 5/55* (2006.01)
(52) U.S. Cl. .................................... 360/245.9; 360/246
(58) Field of Classification Search ....... 360/245.9–246; 29/603.03
See application file for complete search history.

(56) References Cited

U.S. PATENT DOCUMENTS

| | | | |
|---|---|---|---|
| 4,819,094 A | | 4/1989 | Oberg |
| 5,245,489 A * | | 9/1993 | Kimura et al. ............. 360/264.2 |
| 5,694,270 A | | 12/1997 | Sone et al. |
| 5,737,152 A | | 4/1998 | Balakrishnan |
| 5,754,369 A | | 5/1998 | Balakrishnan |
| 5,812,344 A | | 9/1998 | Balakrishnan |
| 5,862,010 A | | 1/1999 | Simmons et al. |
| 5,986,853 A | | 11/1999 | Simmons et al. |
| 5,995,328 A | | 11/1999 | Balakrishnan |
| 6,268,981 B1 | | 7/2001 | Coon et al. |
| 6,278,585 B1 * | | 8/2001 | Olson et al. ................ 360/264.2 |
| 6,801,402 B1 | | 10/2004 | Subrahmanyam et al. |
| 6,839,202 B2 | | 1/2005 | Zhou |
| 6,891,700 B2 | | 5/2005 | Shiraishi et al. |
| 6,975,488 B1 | | 12/2005 | Kulangara et al. |
| 7,079,357 B1 | | 7/2006 | Kulangara et al. |
| 7,092,215 B2 | | 8/2006 | Someya et al. |
| 7,271,985 B1 | | 9/2007 | Buhler et al. |
| 7,319,573 B2 | | 1/2008 | Nishiyama |
| 7,643,252 B2 * | | 1/2010 | Arai et al. .................. 360/245.9 |
| 7,986,495 B2 * | | 7/2011 | Kamei et al. ................. 360/246 |
| 2008/0053686 A1 | | 3/2008 | Ishii et al. |

FOREIGN PATENT DOCUMENTS

| | | |
|---|---|---|
| JP | 53030310 | 3/1978 |
| WO | 9814937 | 4/1998 |

* cited by examiner

*Primary Examiner* — Allen Heinz
(74) *Attorney, Agent, or Firm* — Patterson & Sheridan, LLP

(57) ABSTRACT

An integrated conductor/suspension structure for supporting and electrically connecting a write/read head in a hard disk drive and methods of making the conductor/suspension structure are provided. The integrated conductor/suspension structure may allow for an increased characteristic-impedance range, greater interference shielding and a reduction of signal loss that is contributed by a lossy conductive substrate. The suspension structure includes apertures formed therein that result in a reduction in the lossy material and its effect on the electrical signals. In addition, the conductor/suspension structure of the present invention provides shielding to reduce the interference from external electric fields.

20 Claims, 6 Drawing Sheets

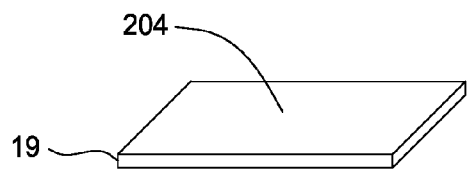
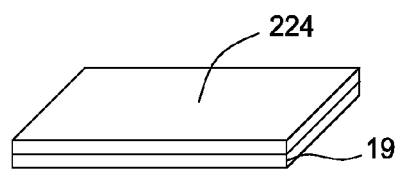
FIG. 3A  FIG. 3B
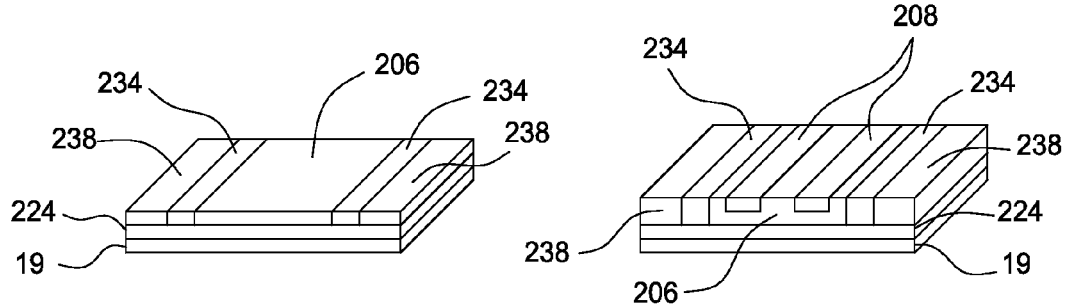
FIG. 3C  FIG. 3D
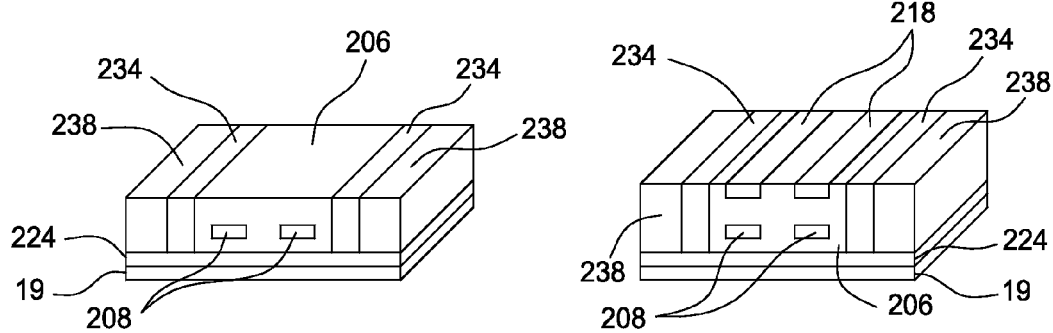
FIG. 3E  FIG. 3F

CONDUCTOR SUSPENSION STRUCTURE AND ELECTRICAL CONNECTION ASSEMBLY FOR TRANSMITTING COMPLEMENTARY SIGNALS IN A HARD DISK DRIVE

BACKGROUND OF THE INVENTION

1. Field of the Invention

Embodiments of the present invention generally relate to an integrated conductor/suspension structure for supporting and electrically connecting a write/read head in a hard disk drive.

2. Description of the Related Art

Hard disk drives typically include a rotating rigid magnetic storage disk and an actuator for positioning a head slider at different radial locations relative to the axis of rotation of the disk, thereby defining numerous concentric data storage tracks on each recording surface of the disk. Although numerous actuator structures are known in the art, in-line rotary voice coil actuators are now most frequently employed due to their simplicity, high performance, and their ability to be mass balanced about their axis of rotation, the latter being important for making the actuator less sensitive to perturbations. A closed-loop servo system within the disk drive is conventionally employed to operate the voice coil actuator and thereby position the heads with respect to the disk surface.

An air bearing surface on a head slider supports the head slider at a small distance away from the surface of the magnetic disk. The head slider also includes a write/read head for writing and reading data to and from the magnetic disk. The write/read head is connected by electrical wires or conductors to associated drive electronics, e.g., a proximately located preamplifier chip and downstream read channel circuitry typically carried on a circuit board (along with other circuitry) that is attached to the head/disk assembly. Single write/read head designs typically require two wire connections while dual designs having separate reader and writer elements require four wire connections. Magnetoresistive (MR) heads in particular generally require four wires. Head sliders are generally mounted to a gimbaled flexure structure attached to the distal end of a suspension's load beam structure, which in turn is connected to the actuator. A spring biases the load beam and the head slider towards the disk, while the air pressure beneath the head slider pushes the head slider away from the disk. An equilibrium distance defines an "air bearing" and determines the "flying height" of the head slider.

The disk drive industry has been progressively decreasing the size and mass of the head slider structures in order to reduce the moving mass of the actuator assembly and to permit closer operation of the transducer to the disk surface, the former giving rise to improved seek performance and the latter giving rise to improved transducer efficiency that can then be traded for higher areal density. Smaller slider structures generally require more compliant gimbals, hence the intrinsic stiffness of the conductor wires attached to the head slider can give rise to a significant undesired bias effect. To reduce the effects of this intrinsic wire stiffness or bias, integrated suspension/conductor structures have been proposed which include hybrid stainless steel flexure and conductor structures. Such hybrid designs typically employ stainless steel flexures having deposited insulating and conductive trace layers for electrical interconnection of the head to the associated drive electronics.

These hybrid flexure designs employ relatively lengthy runs of conductor trace pairs or four-wire sets which extend from bonding pads at the distal, head-mounting end of the flexure to the proximal end of the flexure. Theses traces provide a conductive path from the read/write head along the length of the associated suspension structure to the preamplifier or read-channel chip(s). Because the conductor traces are positioned extremely close to, but electrically isolated from, the conductive stainless steel flexure structure which is in turn grounded to the load beam, and because of the relatively high signal rates being transferred, the conductor trace inductance and mutual coupling, as well as conductor trace resistance and trace capacitance to ground, can give rise to unwanted signal losses, reflections, distortion, and inefficient signal/power transfer. The unwanted signal losses and reflections tend to deleteriously affect the performance of the read/write head, interconnect structure, and driver/preamplifier circuit.

SUMMARY OF THE INVENTION

The present invention generally provides for an integrated conductor/suspension structure for supporting and electrically connecting a write/read head in a hard disk drive and methods of making the conductor/suspension structure. The disclosed integrated conductor/suspension structure allows for an increased characteristic-impedance range, greater interference shielding and a reduction of signal loss that is contributed by a lossy conductive substrate.

In one embodiment, the invention is a conductor/suspension structure for supporting a head and head slider adjacent to a magnetic recording disk. The conductor/suspension structure including: an elongated conductive suspension member, the elongated conductive suspension member having a length, a width, a top surface and a bottom surface and at least one aperture extending at least partially therethrough; a first electrical insulation layer disposed on the suspension member; a first plurality of electrical traces disposed on the first electrical insulation layer and extending over the at least one aperture, for electrically connecting the head to associated circuitry; a second electrical insulation layer disposed on the first plurality of electrical traces; and a second plurality of electrical traces disposed on the second electrical insulation layer and extending over the at least one aperture, for electrically connecting to head to associated circuitry; wherein the first and second plurality of electoral traces each include negative and positive polarity traces, and wherein the first plurality of electrical traces are interleaved relative to the second plurality of electrical traces.

In a further embodiment, the invention is a conductor/suspension structure for supporting a head and head slider adjacent to a magnetic recording disk. The conductor/suspension structure including: an elongated conductive suspension member; a first electrical insulation layer disposed on the suspension member; a first plurality of electrical traces disposed on the first electrical insulation layer; a second electrical insulation layer disposed on the first plurality of electrical traces; a second plurality of electrical traces disposed on the second electrical insulation layer; the first and second plurality of electrical traces configured for electrically connecting the head to associated circuitry and each including negative and positive polarity traces, and wherein the first plurality of electrical traces are interleaved relative to the second plurality of electrical traces; a third electrical insulation layer disposed on the second plurality of electrical traces; and a top conductive shield layer disposed on the third electrical insulation layer.

Another embodiment of the invention is drawn to a method of making a conductor/suspension structure for supporting a head and head slider adjacent to a magnetic recording disk.

The method including: providing an elongated conductive suspension member; forming an electrical connection assembly on the elongated conductive suspension member by: depositing a first electrical insulation layer on the suspension member; depositing a first plurality of electrical traces on the first electrical insulation layer, the first plurality of electrical traces including negative and positive polarity traces configured for electrically connecting the head to associated circuitry; depositing a second electrical insulation layer on the first plurality of electrical traces; and depositing a second plurality of electrical traces on the second electrical insulation layer, the second plurality of electrical traces including negative and positive polarity traces configured for electrically connecting the head to associated circuitry, wherein the first plurality of electrical traces are interleaved relative to the second plurality of electrical traces; and etching the elongated conductive suspension member to form at least one aperture extending at least partially through the elongated conductive suspension member.

In yet another embodiment, the invention is a method of making a conductor/suspension structure for supporting a head and head slider adjacent to a magnetic recording disk. The method including: providing an elongated conductive suspension member; forming an electrical connection assembly on the elongated conductive suspension member by: depositing a first electrical insulation layer on the suspension member; depositing a first plurality of electrical traces on the first electrical insulation layer, the first plurality of electrical traces including negative and positive polarity traces configured for electrically connecting the head to associated circuitry; depositing a second electrical insulation layer on the first plurality of electrical traces; and depositing a second plurality of electrical traces on the second electrical insulation layer, the second plurality of electrical traces including negative and positive polarity traces configured for electrically connecting the head to associated circuitry, wherein the first plurality of electrical traces are interleaved relative to the second plurality of electrical traces; and depositing a final electrical insulation layer on the first plurality of electrical traces; and depositing a top conductive shield layer on the final electrical insulation layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-J are isometric views showing various stages of a method of forming a conductor/suspension structure according to embodiments of the invention.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention provides an integrated conductor/suspension structure for supporting and electrically connecting a write/read head in a hard disk drive. In some embodiments, the disclosed integrated conductor/suspension structure allows for an increased characteristic-impedance range, greater interference shielding and a reduction of signal loss that is contributed by a lossy conductive substrate. The suspension structure that supports the write/read head in a hard disk drive is often formed of a conductive and lossy material such as stainless steel. An electrical connection assembly is routed on top of the suspension structure to connect the write/read head to associated circuitry located remotely in the hard disk drive. The lossy material of the suspension structure can interact with the electrical fields produced by the current flowing through the electrical connection assembly. This interaction results in losses in the electrical signal strengths. Further, due to the relatively low level of the signals routed through the electrical connection assembly, they are susceptible to interference from external electric fields. The present invention overcomes or mitigates these limitations by providing a suspension structure having apertures formed therein. That is, by forming apertures in the suspension structure a reduction in the lossy material and its effect on the electrical signals is realized. In addition, the conductor/suspension structure of the present invention provides shielding to reduce the interference from external electric fields. Methods of producing the conductor/suspension structure are also disclosed.

Figure 1:
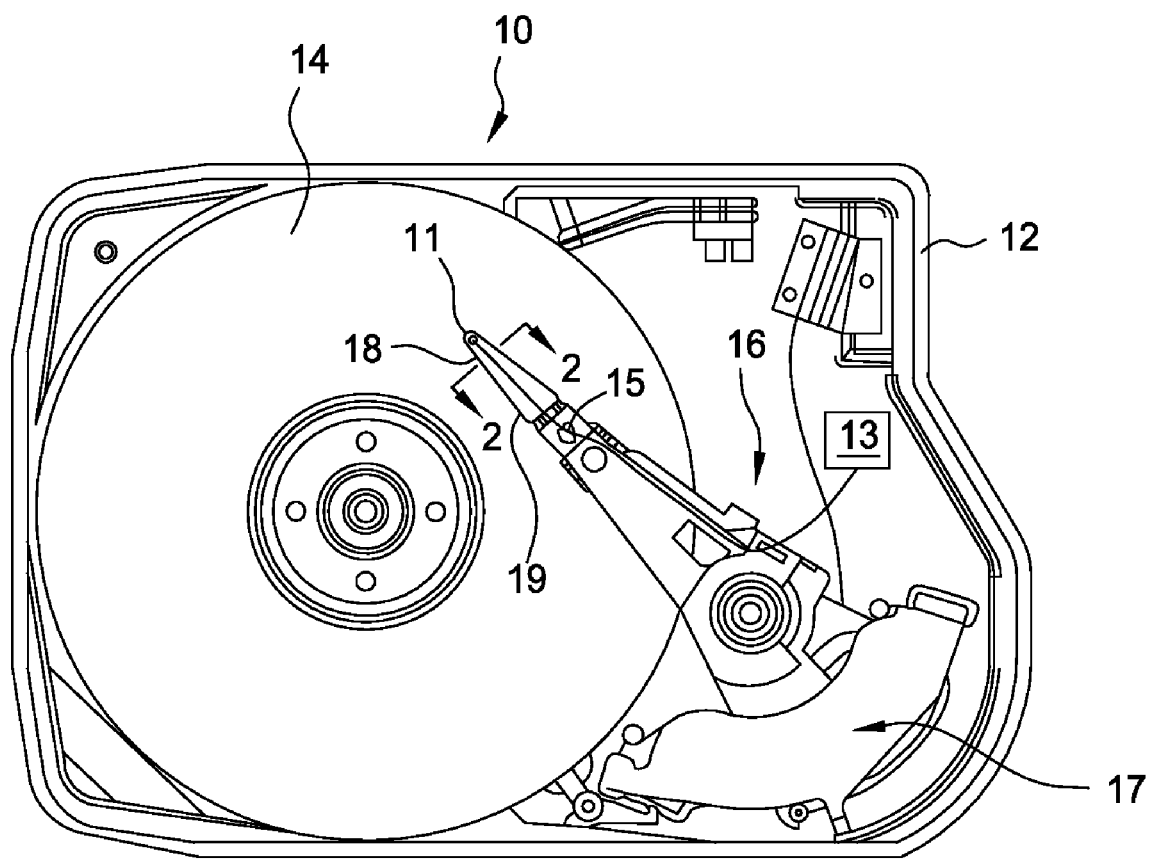
FIG. 1 shows a disk drive having a magnetic disk, and a head slider with a magnetic write/read head mounted on an actuator, according to embodiments of the invention.

FIG. 1 shows one embodiment of a magnetic hard disk drive 10 that includes a housing 12 within which a magnetic disk 14 is fixed to a spindle motor (SPM) by a clamp. The SPM drives the magnetic disk 14 to spin at a certain speed. A head slider 18 includes a head element 11 that accesses a recording area of the magnetic disk 14 and a slider to which the head element 11 is fixed. The head slider 18 is provided with a fly-height control which adjusts the flying height of the head above the magnetic disk 14. An actuator 16 carries the head slider 18 and includes an elongated conductive suspension member 19. The suspension member 19 is flexible to provide a spring action to the actuator 16 and in one embodiment is formed from a non-corrosive metal such as stainless steel. In FIG. 1, the actuator 16 is pivotally held by a pivot shaft, and is pivoted around the pivot shaft by the drive force of a voice coil motor (VCM) 17 as a drive mechanism. The actuator 16 is pivoted in a radial direction of the magnetic disk 14 to move the head slider 18 to a desired position. Due to the viscosity of air between the spinning magnetic disk 14 and the head slider's air bearing surface (ABS) facing the magnetic disk 14, a pressure acts on the head slider 18. The head slider 18 flies low above the magnetic disk 14 as a result of this pressure balancing between the air and the force applied by the suspension member 19 toward the magnetic disk 14.

An electrical connection assembly 15 is disposed on the elongated conductive suspension member 19 and electrically connects the various components of the head 11 (write head, read head, etc.) to associated circuitry 13 located remote from the head 11. The electrical connection assembly 15 and the elongated conductive suspension member 19 form an integrated conductor/suspension structure that supports the head 11 and the head slider 18 adjacent to the magnetic recording disk 14 and electrically connects the head 11 to the associated circuitry 13.

Figure 2A:
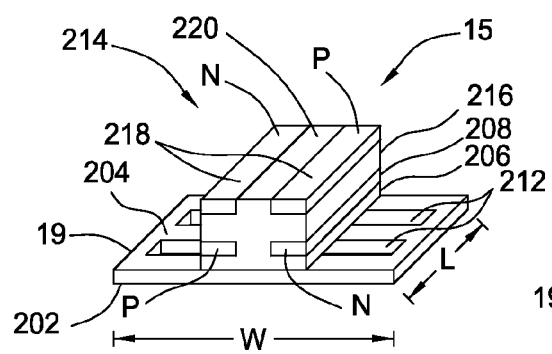
FIG. 2A is a cross sectional isometric view of one embodiment of the conductor/suspension structure shown in FIG. 1, taken through line 2-2 of FIG. 1.

FIG. 2A shows a cross sectional isometric view of a portion of one embodiment of an integrated conductor/suspension structure 214 that includes the elongated conductive suspension member 19 as a supporting substrate for the electrical connection assembly 15, as shown in FIG. 1. The elongated conductive suspension member 19 has a bottom surface 202 (facing the magnetic disk 14), a top surface 204 (facing away from the magnetic disk 14) and a width W extending in the transverse direction of the actuator 16. The portion of the elongated conductive suspension member 19 shown in FIGS. 2A-2H has a unit length L extending in the longitudinal direction of the actuator 16. In this embodiment, the electrical connection assembly 15 includes an electrical insulation layer 206 disposed on the top surface 204 of the suspension member 19. A plurality (two in this embodiment) of electrical traces 208 is disposed on the electrical insulation layer 206. In some embodiments, the plurality of electrical traces 208 include at least one positive phase trace (labeled P), and at least one negative phase trace (labeled N). Write and read signals are coupled to and from the write/read head 11 as an electrical signal between the P and N traces. The plurality of electrical traces 208 are usually formed of a highly conductive material such as gold (Au) or copper (Cu). The electrical insulation layer 206 electrically isolates the plurality of electrical traces 208 from the elongated conductive suspension member 19 and is formed of a dielectric material, which in some embodiments is a polymer such as polyimide.

In the embodiment of FIG. 2A, the elongated conductive suspension member 19 includes a plurality of apertures or windows 212 formed therethrough from the bottom surface 202 to the top surface 204. The plurality of apertures 212 formed through the elongated conductive suspension member 19 reduces the amount of lossy material in close proximity to the electrical connection assembly 15 and thereby reduces the amount of signal loss caused by the material of the suspension member 19. While the apertures 212 are shown as extending completely through the elongated conductive suspension member 19, in some embodiments, they may extend only partially through (similar to a blind bore) the elongated conductive suspension member 19. In either embodiment, the reduced amount of lossy material reduces the amount of signal loss.

The elongated conductive suspension member 19 of FIGS. 2A-2H has a unit area that is defined by its unit length L and its average width W along the unit length L. In some embodiments, the width may vary over the length of the elongated conductive suspension member 19 as shown in FIG. 1, wherein the elongated conductive suspension member 19 tapers towards the head 11. The portion of the plurality of apertures 212 that are within the unit area form open regions that have a second area (the combined area of the openings) within the unit area. In one embodiment, the ratio of the area of the openings within the unit area to the total unit area of the elongated conductive suspension member 19 is between about 1:1 and about 1:500. In embodiments where the plurality of apertures 212 have straight side walls (as shown in the figures), this ratio represents the percentage of material removed from the elongated conductive suspension member 19. The removal of lossy material from the elongated conductive suspension member 19, allows for the adjustment of the characteristic impedance to a desired level and reduces signal loss that is caused by the lossy material. The air/material ratio is not necessarily uniform along the entire length of the elongated conductive suspension member 19, and in some embodiments may be varied to provide different characteristic impedances at different points along the length of the elongated conductive suspension member 19. In addition, the shapes of the apertures 212 need not be rectangular as shown, and various shapes such as circular, ovoid, square, etc. are contemplated. It should also be noted that the electrical connection assembly 15 and the electrical insulation layer 206 disposed on the top surface 204 of the suspension member 19 is not necessarily in the center of the suspension member 19, as shown in the drawings, and may be closer to one longitudinal side or the other longitudinal side of the suspension member 19. The apertures 212 also are not necessarily centered in the suspension member 19, and in some embodiments extended only in those areas where the removal of the lossy material of the suspension member 19 is advantageous, in particular under or proximate the electrical connection assembly 15.

Also in the embodiment of FIG. 2A, the electrical connection assembly 15 is in the form of a bi-layer interleave conductor structure (BICS). The BICS electrical connection assembly 15 includes an electrical insulation layer 206 that electrically isolates a first plurality of electrical traces 208 from the elongated conductive suspension member 19. Above the first plurality of electrical traces 208 is a second electrical insulation layer 216 and a second plurality of electrical traces 218. The second plurality of electrical traces 218 includes at least one positive phase trace (labeled P), and at least one negative phase trace (labeled N). The positive phase trace and the negative phase trace of the second plurality of electrical traces 218 are reversed relative to the positive phase trace and the negative phase trace of the first plurality of electrical traces 208, to thereby form the BICS. By interleaving the signal lines in this manner, a wider range of the characteristic impedance can be achieved for a given insulator thickness. While only two layers of electrical traces are shown in FIG. 2A, it should be understood that the multiple interleaving layers can be replicated to reach the desired characteristic impedance level.

Figure 2B:
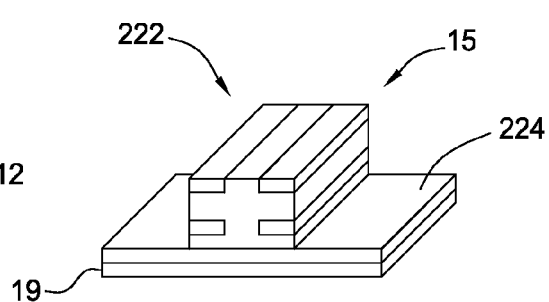
FIG. 2B is a cross sectional isometric view of a second embodiment of the conductor/suspension structure shown in FIG. 1, taken through line 2-2 of FIG. 1.

In FIG. 2B a cross sectional isometric view of a second embodiment of the conductor/suspension structure 222 is shown. The conductor/suspension structure 222 includes a highly conductive layer 224 between the elongated conductive suspension member 19 and the electrical connection assembly 15. In one embodiment, the highly conductive layer 224 is copper-based, although other highly conductive materials such as gold may be used. The conductive layer 224 provides for low signal loss with a low impedance level from substrate coupling. They conductive layer 224 may be used in conjunction with features from the various other embodiments of the conductor/suspension structure. For example, apertures 212 may be provided in the elongated conductive suspension member 19 to further reduce signal losses. While the electrical connection assembly 15 of the conductor/suspension structure 222 is shown as a four trace BICS, in other embodiments the electrical connection assembly 15 may comprise more or less traces.

Figure 2C:
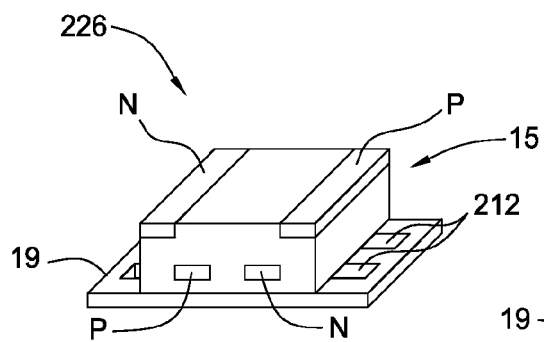
FIG. 2C is a cross sectional isometric view of a third embodiment of the conductor/suspension structure shown in FIG. 1, taken through line 2-2 of FIG. 1.

FIG. 2C depicts a cross sectional isometric view of a third embodiment of the conductor/suspension structure 226. The conductor/suspension structure 226 includes an electrical connection assembly 15 in the form of an offset BICS. By offsetting the upper traces to the outside of the lower traces, a wider characteristic impedance range is achieved by increasing the distance between adjacent traces, while also including a P and N orientation as depicted in FIGS. 2A and 2B. While the conductor/suspension structure 226 is shown without the conductive layer 224, in some embodiments it may include conductive layer 224. Further, while the conductor/suspension structure 226 is shown with apertures 212 in the elongated conductive suspension member 19, in some embodiments of the conductor/suspension structure 226 the apertures 212 may be omitted.

Figure 2D:
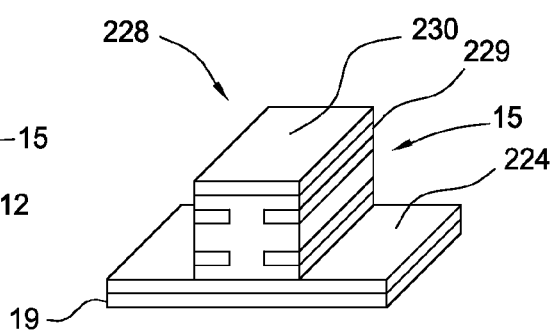
FIG. 2D is a cross sectional isometric view of a fourth embodiment of the conductor/suspension structure shown in FIG. 1, taken through line 2-2 of FIG. 1.

FIG. 2D illustrates a cross sectional isometric view of a fourth embodiment 228 of the conductor/suspension structure. The conductor/suspension structure 228 is similar to the conductor/suspension structure 214 and 222 of FIGS. 2A and 2B, respectively and includes an electrical connection assembly 15 in the form of a BICS. In addition, the conductor suspension structure 228 further includes an electrical insulation layer 229 on top of the electrical connection assembly 15, and a top conductive shield layer 230 disposed on the electrical insulation layer 229. The top conductive shield layer 230, in addition to assisting in controlling the characteristic impedance, also provides interference shielding from nearby electrical fields.

Figures 2E, 2F:
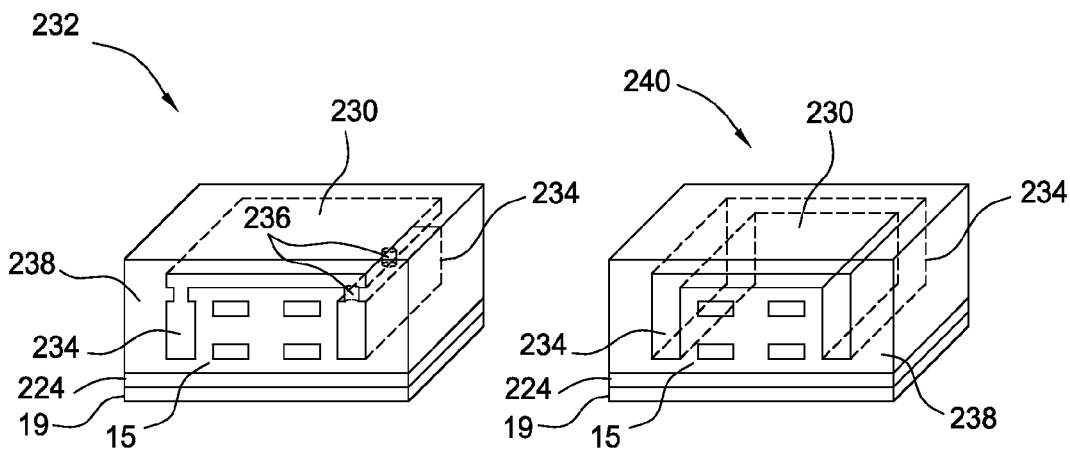
FIG. 2E is a cross sectional isometric view of a fifth embodiment of the conductor/suspension structure shown in FIG. 1, taken through line 2-2 of FIG. 1.
FIG. 2F is a cross sectional isometric view of a sixth embodiment of the conductor/suspension structure shown in FIG. 1, taken through line 2-2 of FIG. 1.

In FIG. 2E a cross sectional isometric view of a fifth embodiment of a conductor/suspension structure 232 is shown. The conductor/suspension structure 232 provides additional shielding through the use of conductive sidewalls 234. The conductive sidewalls 234 are located on either side of the electrical connection assembly 15. In some embodiments, a plurality of spaced vias 236 electrically connects the conductive sidewalls 234 to the top conductive shield layer 230. In one embodiment, the conductive sidewalls 234 and the top conductive shield layer 230 may be covered by an outer dielectric material 238.

FIG. 2F depicts a cross sectional isometric view of a sixth embodiment of the conductor/suspension structure 240. The conductor/suspension structure 240 is substantially similar to the conductor/suspension structure 232 of FIG. 2E. However, in the conductor/suspension structure 240 the conductive sidewalls 234 extend completely to the top conductive shield layer 230, without the need for the plurality of vias 236. By extending the conductive sidewalls 234 to the top conductive shield layer 230, the electrical connection between the conductive sidewalls 234 and the top conductive shield layer 230 is improved, and a more continuous shield structure is formed.

Figures 2G, 2H:
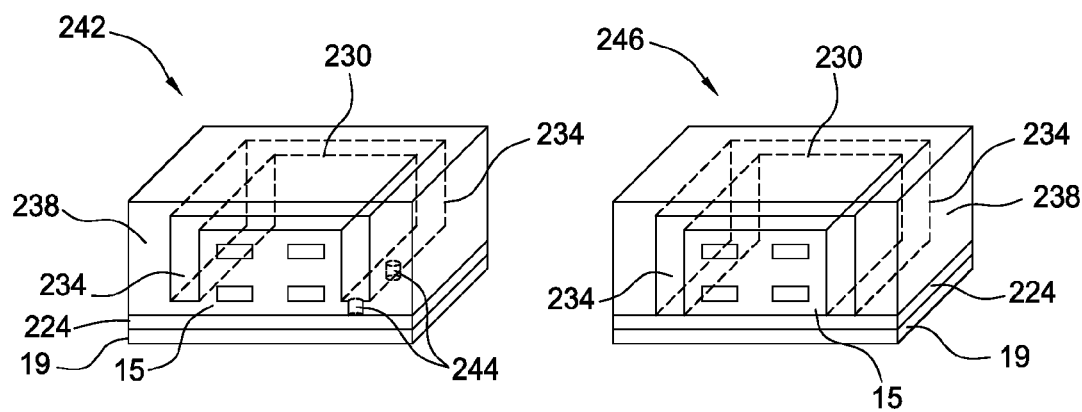
FIG. 2G is a cross sectional isometric view of a seventh embodiment of the conductor/suspension structure shown in FIG. 1, taken through line 2-2 of FIG. 1.
FIG. 2H is a cross sectional isometric view of an eighth embodiment of the conductor/suspension structure shown in FIG. 1, taken through line 2-2 of FIG. 1.

In FIG. 2G a cross sectional isometric view of a seventh embodiment of the conductor/suspension structure 242 is shown. The conductor/suspension structure 242 is substantially similar to the conductor/suspension structure 240 of FIG. 2F. However, in the conductor/suspension structure 242 a plurality of vias 244 electrically connects the conductive sidewalls 234 to the conductive layer 224. In some embodiments, the conductive layer 224 is omitted, and the vias 244 connect the conductive sidewalls 234 to the elongated conductive suspension member 19. The electrically connecting the conductive sidewalls 234 (and the top conductive shield layer 230) to the underlying support, and the shield structure is at the same electrical potential as the underlying support, thereby providing improved control of the characteristic impedance and improved shielding.

FIG. 2H depicts a cross sectional isometric view of an eighth embodiment of the conductor/suspension structure 246. The conductor/suspension structure 246 is substantially similar to the conductor/suspension structure 242 of FIG. 2G. However, in the conductor/suspension structure 240 the conductive sidewalls 234 extend completely to the conductive layer 224, without the need for the plurality of vias 244. By extending the conductive sidewalls 234 to the conductive layer 224, the electrical connection between the conductive sidewalls 234 and the conductive layer 224 is improved, and a more continuous shield structure is formed. In some embodiments, the conductive layer 224 is omitted, and the conductive sidewalls 234 extend to the elongated conductive suspension member 19. In one embodiment, the conductor/suspension structure 246 provides a shield structure that completely surrounds the electrical connection assembly 15 similar to the shield in a coaxial cable.

Figure 3G:
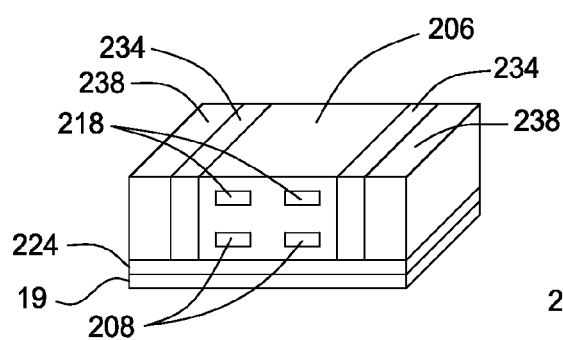

FIGS. 3A-J show isometric views of various stages of assembly of embodiments of a conductor/suspension structure produced by a method according to embodiments of the invention. FIG. 4 is a flow chart of one embodiment of a method 400 of forming a conductor/suspension structure, and will be described in parallel with FIGS. 3A-J. FIG. 3A shows the substrate 19, which in one embodiment is the elongated conductive suspension member 19 of the hard disk drive 10 as shown in FIG. 1. The substrate 19 includes a top surface 204. In one embodiment, the substrate 19 is a flexible, lossy, non-corrosive metal such as stainless steel.

In step 402 of method 400, a highly conductive layer 224 is deposited on the top surface 204 of the substrate 19, as shown in FIG. 3B. The conductive layer 224 is optional and therefore in embodiments where the conductive layer 224 is not required, method 400 begins at step 404. In one embodiment, the conductive layer 224 is copper-based, although other highly conductive materials may be used such as gold. Conductive layer 224 may be deposited using any of a number of deposition techniques such as screen printing, for example.

In step 404 of method 400, a polymer or other dielectric layer is deposited on top of the conductive layer 224, (when present) or on the top surface 204 of substrate 19. In embodiments where the shield sidewalls 234 are desired, a first layer of the shield sidewalls 234 or the vias 244 (see FIG. 2I) is deposited as well. The sidewalls 234 or vias 244, in one embodiment, may be deposited by using a mask-based deposition technique. The dielectric layer is then deposited on the inner region between the sidewalls 234 as the inner dielectric 206, and on the region outside of the sidewalls 234 as outer dielectric 238. When the dielectric layer is deposited, the tops of the sidewalls 234 or vias 244 are masked to avoid deposition of the dielectric layer thereon. If sidewalls 234 and vias 244 are not present, a mask is not required and the entire top surface 204 of substrate 19 or the conductive layer 224 is coated with the dielectric layer. The dielectric layer may be deposited using any of a number of deposition techniques, such as printing, spin coating, etc.

After deposition of the initial dielectric layer, the method 400 proceeds to step 406 wherein the conductor traces 208 are deposited on top of dielectric layer 206 as shown in FIG. 3D. As with the sidewalls 234 or vias 244, the conductor traces 208, in one embodiment, may be deposited by using a mask-based deposition technique. In some embodiments, the conductor traces 208 and the sidewalls 234 or vias 244 are made of the same material. Therefore, they may be deposited in the same step by providing openings in the mask for both the conductor traces 208 and the sidewalls 234 or vias 244. After deposition of the conductive material, the dielectric material of regions 206 and 238 may be deposited in between the conductive features by masking the conductive features prior to depositing the dielectric material.

In step 408 of method 400, further dielectric material is deposited on top of the conductor traces 208, as shown in FIG. 3E. In embodiments where the shield sidewalls 234 are present, when the dielectric layer is deposited, the tops of the sidewalls 234 are masked to avoid deposition of the dielectric layer thereon. If sidewalls 234 are not present, a mask is not required and the entire top surface of the conductor traces 208 and the existing dielectric material is coated with additional dielectric material.

After deposition of the further dielectric material, the method 400 proceeds to step 410 wherein the conductor traces 218 are deposited on top of dielectric layer 206 as shown in FIG. 3F. As with the sidewalls 234 or vias 244, the conductor traces 218, in one embodiment, may be deposited by using a mask-based deposition technique. In some embodiments, the conductor traces 218 and the sidewalls 234 or vias 244 are made of the same material. Therefore, they may be deposited in the same step by providing openings in the mask for both the conductor traces 218 and the sidewalls 234 or vias 244. After deposition of the conductive material, the additional dielectric material of regions 206 and 238 may be deposited in between the conductive features by masking the conductive features prior to depositing the dielectric material.

In step 412 of method 400, further dielectric material is deposited on top of the conductor traces 218, as shown in FIG. 3G. In embodiments where the shield sidewalls 234 are present, when the dielectric layer is deposited, the tops of the sidewalls 234 are masked to avoid deposition of the dielectric layer thereon. In embodiments including vias 236, (see FIG. 2G), only those regions including the vias 236 are masked. If sidewalls 234 and vias 236 are not present, a mask is not required and the entire top surface of the conductor traces 218 and the existing dielectric material is coated with additional dielectric material.

Figure 3H:
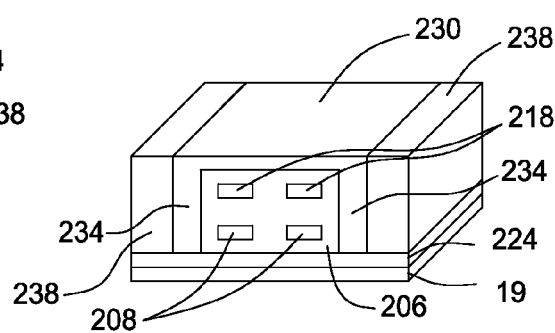
Figure 3I:
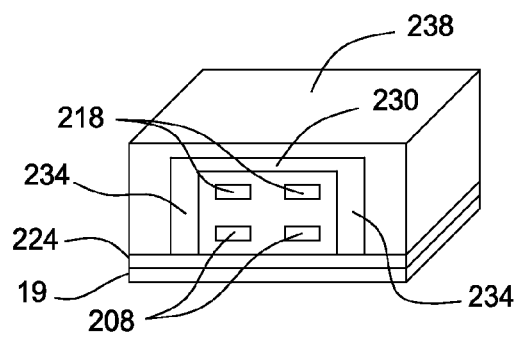
Figure 4:
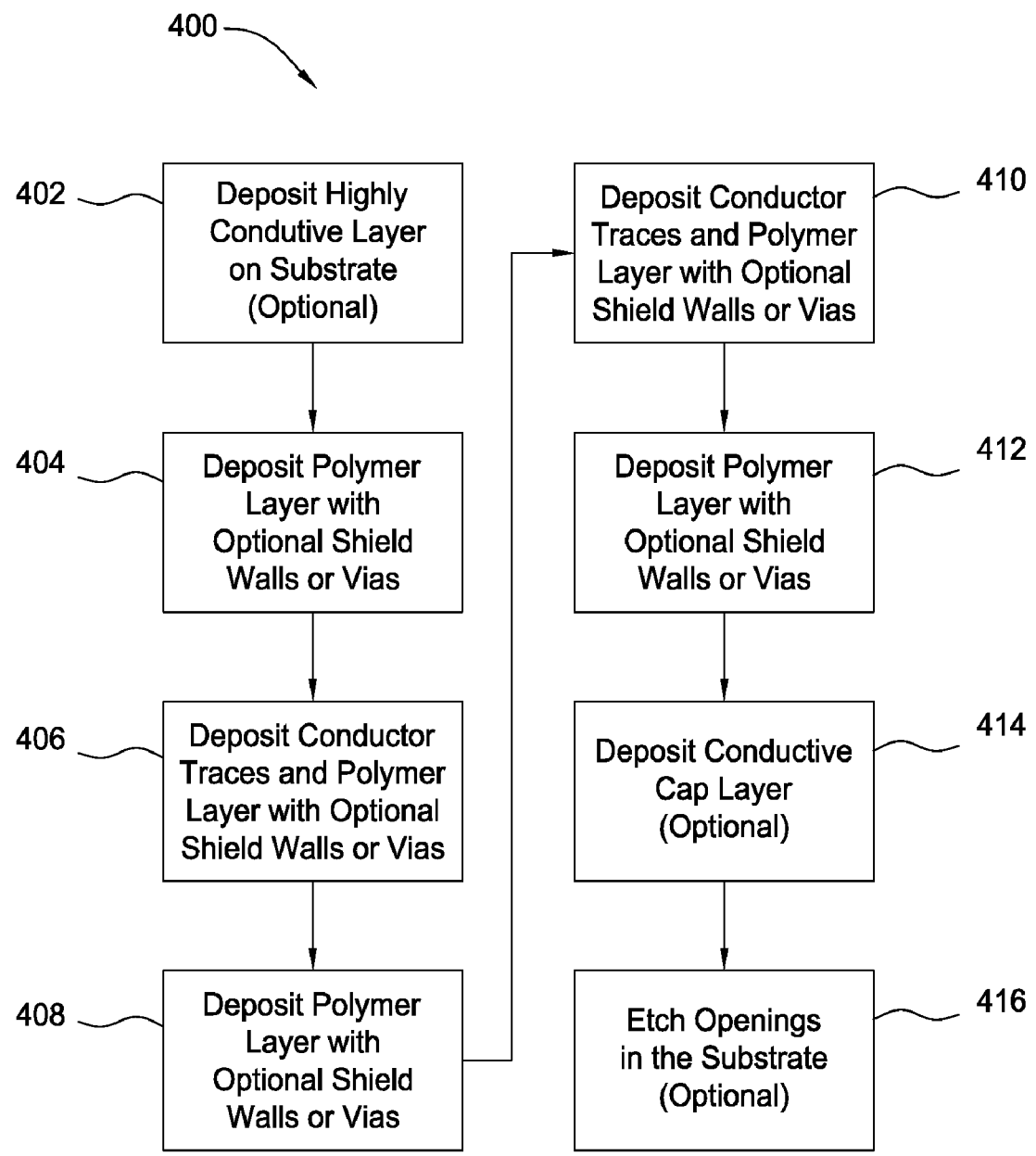
FIG. 4 is a flow chart of a method of forming a conductor/suspension structure according to embodiments of the invention.

In step 414 of method 400 a conductive cap layer 230 is deposited on top of the sidewalls 234 or vias 236, and on the region in between the sidewalls 234 as shown in FIG. 3H. In embodiments wherein the conductive cap layer 230 and the sidewalls 234 are not required, then step 414 may be skipped, and the outer dielectric material 238 is also not required. After the deposition of the conductive cap layer 230 (when present), optional additional dielectric material 238 may be deposited on top of the conductive cap layer 230 as a protective outer covering completely surrounding the conductive material of sidewalls 234 and conductive cap layer 230, as shown in FIG. 3I.

Figure 3J:
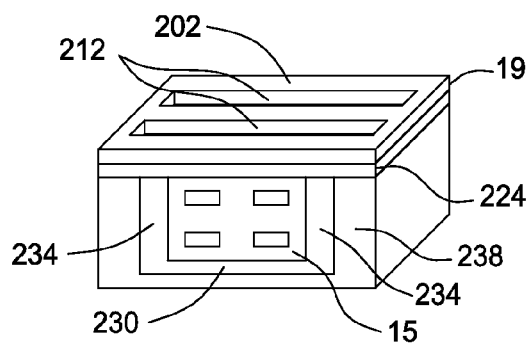

In step 416 of method 400, the optional apertures 212 are etched into the substrate 19, as shown in FIG. 3J. While the assembly in FIG. 3J is shown inverted to display the details of apertures 212, it should be understood that the etching may be performed from beneath the assembly. In one embodiment, as previously described, the substrate 19 is made of stainless steel. Thus, suitable etchants will etch the stainless steel without affecting the conductive layer 224 or sidewalls 234 and the dielectric material, when the conductive layer 224 is not included in the assembly.

While the foregoing is directed to embodiments of the present invention, other and further embodiments of the invention may be devised without departing from the basic scope thereof, and the scope thereof is determined by the claims that follow.

What is claimed is:

1. A conductor/suspension structure for supporting a head and head slider adjacent to a magnetic recording disk, the conductor/suspension structure comprising:
   an elongated conductive suspension member, the elongated conductive suspension member having a length, a width, a top surface and a bottom surface and at least one aperture extending at least partially therethrough;
   a first electrical insulation layer disposed on the suspension member;
   a first plurality of electrical traces disposed on the first electrical insulation layer and extending over the at least one aperture, for electrically connecting the head to associated circuitry;
   a second electrical insulation layer disposed on the first plurality of electrical traces; and
   a second plurality of electrical traces disposed on the second electrical insulation layer and extending over the at least one aperture, for electrically connecting the head to associated circuitry; wherein the first and second plurality of electrical traces each include negative and positive polarity traces, and wherein the negative trace in the first plurality is closer to the positive trace in the second plurality than the positive trace in the first plurality, and the positive trace in the first plurality is closer to the negative trace in the second plurality than the negative trace in the first plurality.

2. The conductor/suspension structure of claim 1, wherein the first plurality of electrical traces are offset relative to the second plurality of electrical traces.

3. The conductor/suspension structure of claim 1, further comprising a conductive layer disposed between the elongated conductive suspension member and the first electrical insulation layer.

4. The conductor/suspension structure of claim 3, wherein the conductive layer comprises a highly conductive material chosen from the group consisting of gold (Au) and copper (Cu).

5. The conductor/suspension structure of claim 1, further comprising:
   a third electrical insulation layer disposed on the second plurality of electrical traces; and
   a top conductive shield layer disposed on the third electrical insulation layer.

6. The conductor/suspension structure of claim 5, further comprising first and second conductive side walls being located outside of the first and second plurality of electrical traces, such that the first and second plurality of electrical traces are located between the first and second conductive side walls, wherein the first and second conductive side walls are electrically connected to the top conductive shield layer.

7. The conductor/suspension structure of claim 6, wherein the first and second sidewalls and the top conductive shield layer are electrically coupled to the conductive suspension member.

8. A conductor/suspension structure for supporting a head and head slider adjacent to a magnetic recording disk, the conductor/suspension structure comprising:
   an elongated conductive suspension member;
   a first electrical insulation layer disposed on the suspension member;
   a first plurality of electrical traces disposed on the first electrical insulation layer;
   a second electrical insulation layer disposed on the first plurality of electrical traces;
   a second plurality of electrical traces disposed on the second electrical insulation layer; the first and second plurality of electrical traces configured for electrically connecting the head to associated circuitry and each including negative and positive polarity traces, and wherein the first plurality of electrical traces are interleaved relative to the second plurality of electrical traces;
   a third electrical insulation layer disposed on the second plurality of electrical traces; and
   a top conductive shield layer disposed on the third electrical insulation layer.

9. The conductor/suspension structure of claim 8, further comprising:
   first and second conductive side walls, the first and second conductive side walls being located outside of the first and second plurality of electrical traces, such that the first and second plurality of electrical traces are located between the first and second conductive side walls.

10. The conductor/suspension structure of claim 9, wherein the first and second conductive side walls are electrically connected to the top conductive shield layer.

11. The conductor/suspension structure of claim 10, wherein the first and second conductive side walls are electrically connected to the elongated conductive suspension member, such that the first and second conductive side walls, the top conductive shield layer and the elongated conductive suspension member form a conductive shield structure around the first and second pluralities of electrical traces.

12. The conductor/suspension structure of claim 10, further comprising:
   a conductive layer disposed between the elongated conductive suspension member and the first electrical insulation layer; wherein
   the first and second conductive side walls are electrically connected to the conductive layer, such that the first and second conductive side walls, the top conductive shield layer and the conductive layer form a conductive shield structure around the first and second pluralities of electrical traces.

13. The conductor/suspension structure of claim 12, wherein the conductive shield structure is continuous.

14. The conductor/suspension structure of claim 12, wherein:
   the first and second conductive side walls are electrically connected to the conductive layer by a first plurality of vias; and
   the first and second conductive side walls are electrically connected to the top conductive shield layer by a second plurality of vias.

15. The conductor/suspension structure of claim 8, wherein the first plurality of electrical traces are offset relative to the second plurality of electrical traces.

16. The conductor/suspension structure of claim 8, further comprising a conductive layer disposed between the elongated conductive suspension member and the first electrical insulation layer.

17. The conductor/suspension structure of claim 16, wherein the conductive layer comprises a highly conductive material chosen from the group consisting of gold (Au) and copper (Cu).

18. The conductor/suspension structure of claim 8, wherein the negative trace in the first plurality is closer to the positive trace in the second plurality than the positive trace in the first plurality and the positive trace in the first plurality is closer to the negative trace in the second plurality than the negative trace in the first plurality.

19. A method of making a conductor/suspension structure for supporting a head and head slider adjacent to a magnetic recording disk, the method comprising:
   providing an elongated conductive suspension member;
   forming an electrical connection assembly on the elongated conductive suspension member by:
      depositing a first electrical insulation layer on the suspension member;
      depositing a first plurality of electrical traces on the first electrical insulation layer, the first plurality of electrical traces including negative and positive polarity traces configured for electrically connecting the head to associated circuitry;
      depositing a second electrical insulation layer on the first plurality of electrical traces; and
      depositing a second plurality of electrical traces on the second electrical insulation layer, the second plurality of electrical traces including negative and positive polarity traces configured for electrically connecting the head to associated circuitry, wherein the negative trace in the first plurality is closer to the positive trace in the second plurality than the positive trace in the first plurality, and the positive trace in the first plurality is closer to the negative trace in the second plurality than the negative trace in the first plurality; and
   etching the elongated conductive suspension member to form at least one aperture extending at least partially through the elongated conductive suspension member.

20. A method of making a conductor/suspension structure for supporting a head and head slider adjacent to a magnetic recording disk, the method comprising:
   providing an elongated conductive suspension member;
   forming an electrical connection assembly on the elongated conductive suspension member by:
      depositing a first electrical insulation layer on the suspension member;
      depositing a first plurality of electrical traces on the first electrical insulation layer, the first plurality of electrical traces including negative and positive polarity traces configured for electrically connecting the head to associated circuitry;
      depositing a second electrical insulation layer on the first plurality of electrical traces; and
      depositing a second plurality of electrical traces on the second electrical insulation layer, the second plurality of electrical traces including negative and positive polarity traces configured for electrically connecting the head to associated circuitry, wherein the first plurality of electrical traces are interleaved relative to the second plurality of electrical traces; and
   depositing a final electrical insulation layer on the second plurality of electrical traces; and
   depositing a top conductive shield layer on the final electrical insulation layer.

* * * * *